United States Patent
Hanisko

[11] Patent Number: 5,835,009
[45] Date of Patent: Nov. 10, 1998

[54] SINGLE WIRE BRAKE CONDITION SENSING SYSTEM

[76] Inventor: John-Cyril P. Hanisko, 21888 Murray Crescent, Southfield, Mich. 48076

[21] Appl. No.: 752,349

[22] Filed: Nov. 19, 1996

[51] Int. Cl.[6] .................................................. B60Q 1/00
[52] U.S. Cl. .............. 340/454; 188/1.11 E; 188/1.11 R; 340/453
[58] Field of Search ..................... 340/454, 453; 116/208; 188/1.11 E, 1.11 R, 196 R

[56] References Cited

U.S. PATENT DOCUMENTS

| | | |
|---|---|---|
| 1,957,051 | 5/1934 | Norton . |
| 2,217,176 | 10/1940 | Madison . |
| 3,297,985 | 1/1967 | Trebonsky et al. . |
| 3,398,246 | 8/1968 | Linet . |
| 3,553,643 | 1/1971 | Maras . |
| 3,674,114 | 7/1972 | Howard . |
| 3,755,774 | 8/1973 | Wilhelmi ................................. 340/454 |
| 3,776,329 | 12/1973 | Hope et al. .............................. 188/1.11 |
| 3,825,891 | 7/1974 | Kinast . |
| 3,902,158 | 8/1975 | Dahlkvist . |
| 4,004,269 | 1/1977 | Arai et al. ................................ 340/454 |
| 4,204,190 | 5/1980 | Wiley et al. . |
| 4,387,789 | 6/1983 | Borugian ................................. 188/1.11 |
| 4,562,421 | 12/1985 | Duffy ........................................ 188/79 |
| 4,646,001 | 2/1987 | Baldwin et al. ........................ 188/1.11 |
| 4,800,991 | 1/1989 | Miller ...................................... 188/1.11 |
| 4,824,260 | 4/1989 | Novotny et al. ......................... 340/453 |
| 5,253,735 | 10/1993 | Larson et al. ........................... 188/1.11 |
| 5,285,190 | 2/1994 | Humphreys et al. .................... 340/453 |
| 5,302,940 | 4/1994 | Chen ........................................ 340/454 |
| 5,339,069 | 8/1994 | Penner et al. ............................ 340/454 |
| 5,347,858 | 9/1994 | Ito et al. .................................. 340/454 |
| 5,358,075 | 10/1994 | Jarzombek ............................... 188/1.11 |
| 5,419,415 | 5/1995 | Lamb et al. ............................. 188/1.11 |
| 5,450,930 | 9/1995 | Martens et al. .......................... 188/1.11 |

*Primary Examiner*—Brent A. Swarthout
*Attorney, Agent, or Firm*—Longacre & White

[57] ABSTRACT

A single wire electrical conductor is serially connected to a first switch mounted to a brake slack adjuster and serially connected to a second switch embedded in a brake lining. The closing and opening of the first and/or second switch causes electrical changes that are measured in an electronic control unit for use in signaling the operator of the need for brake service.

17 Claims, 2 Drawing Sheets

SINGLE WIRE BRAKE CONDITION SENSING SYSTEM

BACKGROUND OF THE INVENTION

The present invention relates to a system to measure the condition of a vehicle brake and, more specifically, to a system to detect and generate a signal when the brake slack adjuster and/or the brake lining thickness reach a predetermined service limit.

It is known to use a temperature sensitive device embedded in a brake shoe to measure the operating temperature of the brake shoe. The output of the device is electrically monitored and used to signal when an abnormal temperature event occurs. U.S. Pat. Nos. 1,957,051 3,674,114; 4,824,260 and 5,302,940 disclose various systems to use a temperature sensitive device such as a thermistor to measure brake shoe temperature using a two wire electrical connection to an output indicator device.

U.S. Pat. Nos. 2,217,176; 3,398,246; 3,553,643; 4,387, 789 and 4,562,421 disclose various systems that signal when the brake lining has worn to a selected point(s) whereupon a conductor element makes contact with the brake drum. The grounding of the conductor is measured by an electronic device that in turn signals to the operator or a separate recording device when the grounding of the conductor against the brake drum occurs. Generally, the conductor is electrically connected to the monitor device using two electrical conductors.

U.S. Pat. Nos. 3,297,985; 3,825,891; 3,902,158; 4,004, 269; 4,204,190; 4,646,001; 5,347,858 and 5,419,415, the disclosures of which are hereby incorporated by reference, disclose systems to signal when the brake lining has worn to a selected point whereupon an embedded conductor is worn away to open the conductor. In essence, the conductor operates as a normally closed switch which changes state when the brake lining wears to its service limit.

Prior art slack adjusters have used switching devices to signal when the brake adjuster has reached the end of travel and readjusting or relining is required. Examples of such devices are disclosed in U.S. Pat. Nos. 3,776,329; 5,253, 735; 5,285,190; 5,339,069 and 5,358,075 the disclosures of which are hereby incorporated by reference. The switch, which is mounted to the slack adjuster, is electrically connected to a monitoring device using two connecting wires. These types of devices function to electrically signal when the brake slack adjuster has traveled to its service limit thereby signaling the need for brake service.

Wire connectors used to connect the sensors in the vicinity of the brake drum to monitoring equipment have to be properly secured and must withstand extremely high operating temperatures during vehicle operation. If two sensors are used, one to detect lining thickness and another to detect travel of the slack adjuster, four separate wire conductors are required for connection from the brake system to monitoring electronics. These conductors are susceptible to damage and add cost to the brake condition sensing system.

SUMMARY OF THE INVENTION

The present invention discloses a vehicle brake condition sensing system where a single conductor is used for electrical connection to a switch mounted to the brake slack adjuster and a switch embedded in the brake lining. In addition to the switches, a plurality of resistors can be introduced into the circuit to provide additional sensing capability. By selecting the value of each of the plurality of resistors, the output voltage can be measured where a specific voltage level represents a specific brake service condition due to either wear of the brake shoe lining or end of travel of the slack adjuster. Also plurality of resistors are used to generate a specific voltage that represents a service condition due to open or grounding of the wiring. An electronic control unit houses a source of electrical power such as a constant current or a voltage source depending on the application and also interprets the output voltage level for communication to the operator and/or to another electronic device.

With the present invention only one wire conductor is needed to connect the brake lining sensor and the slack adjuster to the electronic control unit where prior art systems required two conductors for each sensor for a total of four. Reduction of the number of conductors reduces cost and improves reliability.

One provision of the present invention is to monitor the condition of a brake lining using a single wire conductor.

Another provision of the present invention is to monitor the condition of a brake lining using a plurality of resistors connected in series and in parallel with a single wire conductor.

Another provision of the present invention is to monitor the condition of a brake lining and a brake slack adjuster using a single wire conductor.

Another provision of the present invention is to monitor the condition of a brake lining and a brake slack adjuster using a plurality of resistors connected in parallel and in series with a single wire conductor.

Still another provision of the present invention is to provide a system to monitor the thickness of a brake lining and the travel limit of a brake slack adjuster using a single wire conductor connected to a plurality of parallel and series resistors and a current source using an electronic control unit to interpret an output voltage.

DETAILED DESCRIPTION OF THE PREFERRED EMBODIMENT

Figure 1:
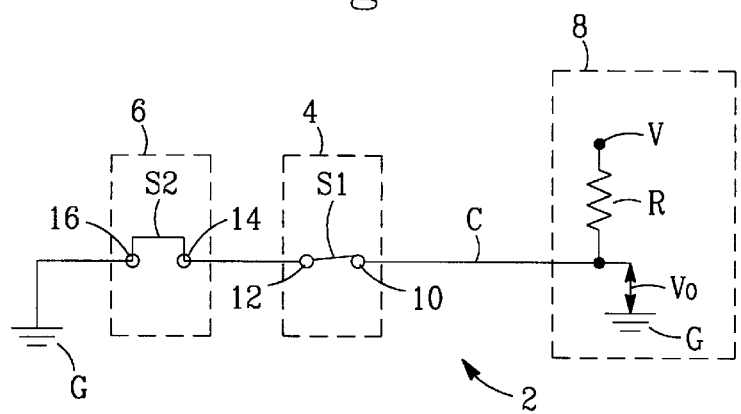
FIG. 1 is a schematic diagram of the first embodiment of the brake condition monitoring system of the present invention.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. I of the drawings, a schematic diagram of a first embodiment of the brake condition sensing system 2 of the present invention is shown. A first switch S1 is adapted to change state when a brake slack adjuster 4

(shown schematically) reaches its end of travel service limit. A second switch S2 is embedded within a brake lining 6 (shown schematically) and changes state when the lining wears to its service limit. An electronic control unit 8 is electrically connected by a single wire conductor C to switch S1 and serially to switch S2 and to electrical ground G. Switch S1 is a normally closed switch which is structurally connected to the brake slack adjuster 4 in some manner such as that disclosed in U.S. Pat. No. 3,776,329 such that when the slack adjuster reaches the out of adjustment range, the switch S1 is opened.

Internal to the control unit 8, the conductor C is connected to a voltage source V through a resistor R. The level of the output voltage Vo indicates the condition of the brake system which includes the slack adjuster 4 and the lining 6 and is interpreted by the electronic control unit 8 whereupon the information is transmitted to another part of the vehicle such as the vehicle cab for display to the operator and/or another electronic control unit.

Switch S1 is a normally closed switch adapted to a brake slack adjuster such that switch S1 is opened when the slack adjuster reaches its service limit. Examples are shown in U.S. Pat. Nos. 3,776,329; 5,253,735 and 5,358,075.

Switch S2 functions as a normally closed switch which is embedded in the vehicle brake lining 6 such that upon reaching the service limit of the brake lining 6 due to wear, the switch S2 opens from the closed position as shown schematically in FIG. 1. Examples of such brake wear switching systems may be seen by reference to U.S. Pat. Nos. 3,825,891; 3,902,158; 4,204,190 and 5,419,415.

Switch S2 functions as a normally closed switch which can be a breakable conductive element embedded within the brake lining 6 such that the conductive element is broken by wear of the brake lining 6 at its service limit thereby functioning as a normally closed switch which opens when the brake lining 4 wears to its service limit.

Thus, in normal operation, both switch S1 and switch S2 are closed as shown in FIG. 1. Electrical switches S1 and S2 are connected in series between the electronic control unit 8 and chassis ground G by a single wire conductor C as shown in FIG. 1. If switch S1 and switch S2 are closed, then the output voltage Vo is equal to the potential at ground G. If either switch S1 or switch S2 opens due to the slack adjuster 4 and/or the brake lining 6 reaching a service limit, then the output voltage Vo will be equal to the supply voltage V indicating that brake service is required. Also, if a break occurs in the connector C, then the output voltage Vo will go to the supply voltage V thereby indicating a service issue. The electronic control unit 8 can be electrically connected to another electronic device to signal the need for service and/or the second electronic control unit can alter truck operation until service can be obtained.

Figure 2:
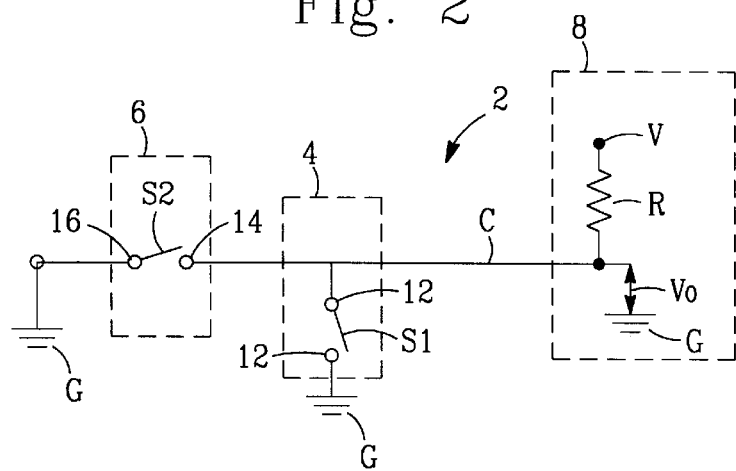
FIG. 2 is a schematic diagram of the second embodiment of the present invention.

Now referring to FIG. 2, a second embodiment of the present invention is shown where switch S1 is connected to ground G and is normally open and switch S2 is normally open where one side of switch S2 is embedded in the brake shoe and makes contact with the brake drum when the brake lining 6 wears to its service limit thereby connecting the conductor C to ground G. In normal operation, the output voltage Vo is equal to the supply voltage V. When the brake slack adjuster 4 reaches its service limit, switch S1 closes and connects the conductor C to ground G and the output voltage Vo is reduced to the potential at ground G. If the brake lining 6 wears to its service limit, switch S2 is closed by a conductive element embedded in the brake lining 6 which contacts the brake drum thereby connecting the conductor C to ground G and the output voltage Vo is again reduced to the potential at ground G. When the output voltage Vo equals the ground G potential, a signal is generated by the electronic control unit 8 which is transmitted to another electronic module for display in the vehicle cab and/or use for vehicle control and/or readout by an external diagnostic unit and/or airwave transmission to a central control facility.

In operation, if both switch S1 and switch S2 are open, then the brake system is in a normal operating condition and the voltage Vo is equal in magnitude to the voltage V as supplied to conductor C through resistor R. For example, one side of the switch S2 can be embedded within the brake shoe and the second side of switch S2 can be electrically connected to the brake drum which is at ground G potential. If wear of brake lining 6 has caused switch S2 to close or if the slack adjuster 4 has reached its service limit and switch S1 is closed, then voltage Vo will be at the potential of ground G. Also, in either mode, if the conductor C has been shorted to ground, irrespective of the state of switches S1 and S2, the voltage Vo will be at ground G potential thereby indicating that service is needed to correct the wiring fault and/or service the brake lining 6.

Figure 3:
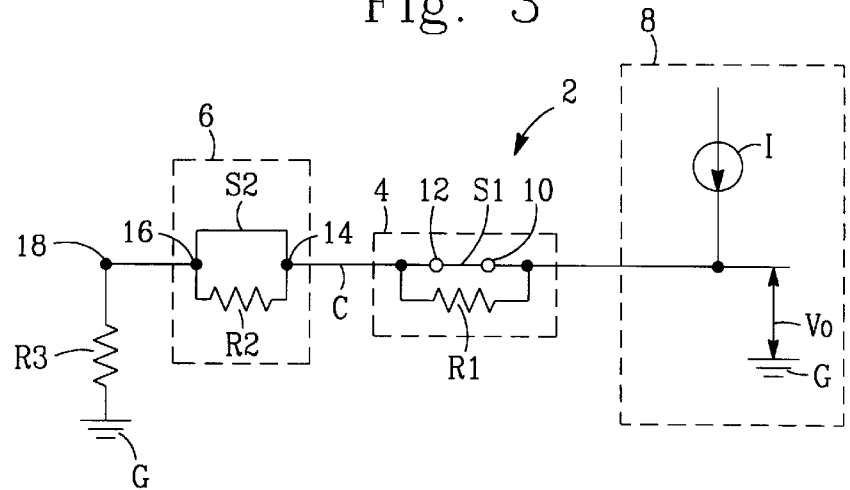
FIG. 3 is a schematic diagram of a third embodiment of the present invention.

Now referring to FIG. 3, a schematic diagram of a third embodiment of the present invention is shown where resistors R1, R2 and R3 have been added along with a current source I to replace the input voltage V shown in FIGS. 1 and 2. Resistor R1 is connected in parallel across switch S1 providing for a specific voltage drop when switch S1 is opened depending on the value of resistor R1. Resistor R2 is connected in parallel across switch S2 providing for a specific voltage drop when switch S2 is opened depending on the value of resistor R2. Resistor R3 is connected in series between switch S2 and resistor R2 and ground G thereby providing for a specific voltage drop depending on the state of switches S1 and S2 and the value of resistors R1, R2 and R3. Switches S1 and S2 function as described in reference to FIG. 1. Switch S2 can be a conductive loop of wire embedded within the brake lining 6 which is worn open when the brake lining 4 is worn to its service limit. Thus, in normal operation, both resistors R2 and R3 are connected in series by conductor C to the electronic control unit 8. When the slack adjuster 4 travels to service limit, switch S1 opens and resistor R1 is put in service with resistors R2 and R3.

The values for R1, R2 and R3 must be selected such that the following relationships are satisfied:

$$R1 \neq R2,\ R1 \neq R3,\ R2 \neq R3\ \text{and}\ R1+R2 \neq R3,\ R1+R3 \neq R2\ \text{and}\ R2+R3 \neq R1$$

Assuming the preceding conditions are satisfied, the output voltage Vo measured between the conductor C and ground G depends on the state of the switches S1 and S2 and the conductor C. Current source I is a constant current source contained within the electronic control unit 8. The magnitude of the output voltage Vo for selected conditions can be calculated based on the value of the current source I and the resistors R1, R2 and R3 as follows:

| Brake System Condition | Output Voltage Vo |
|---|---|
| Normal | $V_o = IR_3$ |
| Slack Adjuster at Service Limit | $V_o = I(R1 + R3)$ |
| Brake Lining Worn to | $V_o = I(R2 + R3)$ |

-continued

| Brake System Condition | Output Voltage Vo |
|---|---|
| Service Limit Slack Adjuster and Brake Lining at Service Limit | Vo = I (R1 + R2 + R3) |
| Conductor open | Vo > I(RI + R2 + R3) |
| Conductor shorted to Ground | Vo reduced by I R3 |

After measurement of the output voltage Vo, a plurality of capacitors (not shown) within the electronic control unit 8 are used to determine the proper fault code for the brake condition for transmission externally to the vehicle cab for display to the operator or to other electronic devices.

Figure 4:
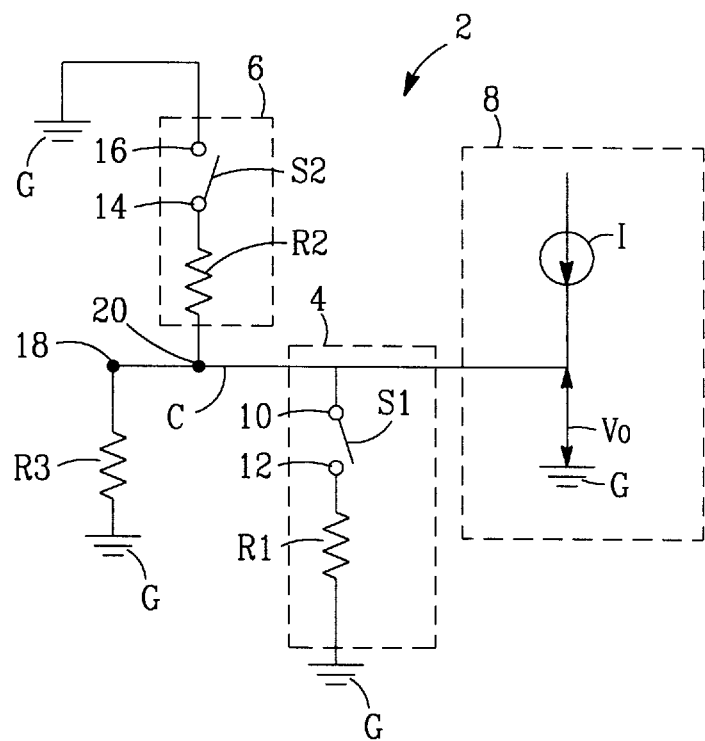
FIG. 4 is a schematic diagram of a fourth embodiment of the present invention.

Now referring to FIG. 4, a schematic diagram of a fourth embodiment of the present invention is shown where a plurality of resistors R1, R2 and R3 are connected in series with other circuit elements. Switch S1 is normally open and closes when the brake slack adjuster 4 reaches its service limit. Switch S2 is normally open and closes when the brake lining 6 wears to its service limit causing a conductive element embedded in the brake lining 6 to contact the brake drum (not shown) thereby connecting resistor R2 to ground G. Examples of similar brake drum contact systems are shown in U.S. Pat. Nos. 2,217,176; 3,297,985; 3,398,246 and 4,387,789 the disclosures of which are incorporated by reference.

Resistor R1 is connected in series between ground G and switch S1. Resistor R2 is connected in series between the conductor C and switch S2 when switch S2 is also connected in series with ground G. Resistor R3 is connected in series between resistor R2 and ground G on the conductor C side of resistor R2. The values of resistors R1, R2 and R3 must be properly selected such that the following relationships are satisfied:

$$R1 \neq R2, R2 \neq R3, R1 \neq R3.$$

Current source I is a constant current source contained within the electronic control unit 8. The output voltage Vo is measured between the conductor C and ground G and its value indicates the condition of the slack adjuster 4, brake lining 6 and the conductor C according to the following chart:

| Brake System Condition | Output Voltage Vo |
|---|---|
| Normal | Vo = IR3 |
| Slack Adjuster at Service Limit | $Vo = I\left(\frac{R1R3}{R1+R3}\right)$ |
| Brake Lining at Service Limit | $Vo = I\left(\frac{R2R3}{R2+R3}\right)$ |
| Slack Adjuster and Brake Lining at Service Limit | $Vo = I\left(\frac{R1R2 + R1R3 + R2R3}{R1R2R3}\right)$ |
| Conductor C open | Vo > IR where R = largest of R1 or R2 or R3 |
| Conductor C short to ground | Vo = 0 |

It will be appreciated by those or ordinary skill in the art that many variations in the forgoing preferred embodiments are possible while remaining within the scope of the present invention. The present invention should thus not be considered limited to the preferred embodiments or the specific choices of materials, configurations, dimensions, applications or ranges of parameters employed therein, but only by the claims as herein follows.

I claim:

1. A brake condition sensing system (2) for a brake having a brake lining (6) which contacts a rotating braking surface upon movement of a slack adjuster (4) comprising:

a first switch (S1) adapted to change state when said slack adjuster (4) travels to a preselected adjuster service limit;

a second switch (S2) disposed within said brake lining (6), said second switch (S2) adapted to change state when said brake lining (6) wears to a preselected lining service limit;

an electronic control unit (8) having a source of electrical power contained therein;

a conductor (C) electrically connected to said electronic control unit (8) and electrically connected to said first switch (S1) and electrically connected to said second switch (S2);

an output voltage (Vo) measured between said conductor (C) and an electrical ground (G);

where the level of said output voltage (Vo) is interpreted by said electronic control unit (8) to estimate the thickness of said brake lining (6).

2. The brake condition sensing system (2) of claim 1, wherein said first switch (S1) is electrically connected by conductor (C) in series with said second switch (S2) which is connected in series with ground (G) and where said first switch (S1) is normally closed and opens when said slack adjuster (4) travels to said adjuster service limit thereby causing said output voltage (Vo) to increase from the voltage level of ground (G) to the voltage level of said source of electrical power.

3. The brake condition sensing system (2) of claim 1, wherein said first switch (S1) is electrically connected in series with said second switch (S2) which is connected in series with ground (G) and where said second switch (S2) is normally closed and opens when said brake lining (6) wears to said lining service limit thereby causing said output voltage (Vo) to increase from the voltage level of ground (G) to the voltage level of said source of electrical power.

4. The brake condition sensing system (2) of claim 1, wherein said first switch (S1) is electrically connected between said conductor (C) and said ground (G) and closes when said slack adjuster (4) travels to said adjuster service limit thereby causing said output voltage (Vo) to decrease to the voltage level of said ground (G).

5. The brake condition sensing system (2) of claim 1, wherein said second switch (S2) is electrically connected between said conductor (C) and said ground (G) and closes when said brake lining (6) wears to said lining service limit thereby causing said output voltage (Vo) to decrease to the voltage level of said ground (G).

6. The brake condition sensing system (2) of claim 1, further comprising a first resistor (R1) electrically connected across said first switch (S1) and a second resistor (R2) electrically connected across said second switch (S2) and a third resistor (R3) electrically connected between said second switch (S2) and said ground (G), where said first switch (S1) is electrically connected to said electronic control unit (8) and in series with said second switch (S2) and said third resistor (R3) and wherein said source of electrical power is a constant current source (I).

7. The brake condition sensing of system (2) of claim 6, wherein said first switch (S1) is normally closed and said second switch (S2) is normally closed and opens when said brake lining (6) wears to said lining service limit thereby causing said output voltage (Vo) to increase to a level defined by the relationship Vo=I(R2+R3).

8. The brake condition sensing system (2) of claim 6, wherein said second switch (S2) is normally closed and said first switch (S1) is normally closed and opens when said slack adjuster (4) travels to said adjuster service limit thereby causing said output voltage (Vo) to decrease to a level defined by the relationship Vo=I(R1+R3).

9. The brake condition sensing system (2) of claim (1) further comprising a first resistor (R1) electrically connected to said first switch (S1) and to said ground (G) and a second resistor (R2) electrically connected to said conductor (C) and to said second switch (S2), said second switch (S2) connected to said ground (G) and a third resistor (R3) connected between said conductor (C) and said ground (G) and where said source of electrical power is a constant current service (I).

10. The brake condition sensing system (2) of claim 9, wherein said first switch (S1) is normally open and closes when said slack adjuster (4) travels to said adjuster service limit thereby causing said output voltage (Vo) to decrease to a level defined by the relationship $$Vo = I\left(\frac{R1R3}{R1+R3}\right).$$

11. The brake condition sensing system (2) of claim 9, wherein said second switch (S2) is normally open and closes when said brake lining (6) wears to said lining service limit thereby causing said output voltage (Vo) to decrease to a level defined by the relationship $$Vo = I\left(\frac{R2R3}{R2+R3}\right).$$

12. A brake condition sensing system (2) for a brake having a brake lining (6) which contacts a rotating braking surface upon movement of a slack adjuster (4) comprising:
a first switch (S1) adapted to change state when said slack adjuster (4) travels to a preselected adjuster service limit;
a second switch (S2) adapted to change state when said brake lining (6) wears to a preselected lining service limit;
an electronic control unit (8) having a source of electrical power contained therein;
an electrical ground (G);
an electrical conductor (C) connecting said source of electrical power with said first switch (S1) and then said second switch (S2) and then said electrical ground (G);
where an output voltage (Vo) is measured between said conductor (C) and said electrical ground (G) which is used to estimate a condition of said brake by said electronic control unit (8).

13. The brake condition sensing system (2) of claim 12, further comprising a plurality of resistors (R1,R2,R3) connected to said conductor (C).

14. The brake condition sensing system (2) of claim 12, wherein said first switch (S1) is normally open and closes when said slack adjuster (4) travels to said adjuster service limit thereby causing said output voltage (Vo) to change to a predetermined level.

15. The brake condition sensing system (2) of claim 12, wherein said second switch (S2) is normally open and closes when said brake lining wears to said lining service limit thereby causing said output voltage (Vo) to change to a predetermined level.

16. The brake condition sensing system (2) of claim 12, wherein said first switch (S1) is normally closed and opens when said slack adjuster (4) travels to said adjuster service limit thereby causing said output voltage (Vo) to change to a predetermined level.

17. The brake condition sensing system (2) of claim 12, wherein said second switch (S2 is normally closed and opens when said brake lining wears to said lining service limit thereby causing said output voltage (Vo) to change to a predetermined level.

* * * * *